(12) United States Patent
Mukherjee et al.

(10) Patent No.: US 7,133,925 B2
(45) Date of Patent: Nov. 7, 2006

(54) SYSTEM, METHOD, AND FORMAT THEREOF FOR SCALABLE ENCODED MEDIA DELIVERY

(75) Inventors: Debargha Mukherjee, San Jose, CA (US); Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 10/196,506

(22) Filed: Jul. 15, 2002

(65) Prior Publication Data

US 2004/0010614 A1    Jan. 15, 2004

(51) Int. Cl.
*G06F 15/16* (2006.01)
*G06F 17/00* (2006.01)

(52) U.S. Cl. .................. 709/231; 709/232; 709/246; 707/101

(58) Field of Classification Search .............. 709/231, 709/232; 707/101
See application file for complete search history.

(56) References Cited

U.S. PATENT DOCUMENTS

| | | | | |
|---|---|---|---|---|
| 5,926,624 A | * | 7/1999 | Katz et al. | 709/217 |
| 5,928,330 A | * | 7/1999 | Goetz et al. | 709/231 |
| 5,949,792 A | * | 9/1999 | Yasuda et al. | 370/474 |
| 5,953,506 A | * | 9/1999 | Kalra et al. | 709/231 |
| 2001/0043745 A1 | * | 11/2001 | Friederich et al. | 382/232 |
| 2003/0028387 A1 | * | 2/2003 | Kilbank | 704/500 |

* cited by examiner

*Primary Examiner*—Rupal Dharia
*Assistant Examiner*—Ranodhi Serrao (57) ABSTRACT

A system, method, and bit-stream format thereof for delivery, scalable encoded media data is described. The scalable encoded bit-stream is formatted to have first and second portions. The first portion corresponds at least to non-media type specific scalability attributes of the original encoded media data and data structure information of a second portion and the second portion corresponds to the original scalable encoded media data arranged in a non-media type specific indexable data structure having at least one dimension. The formatted media data allows the system and method to provide seamless, flexible delivery to media destinations having a variety of receiving attributes. The media data is transcoded prior to delivery based on the receiving attributes of the media destination and non-media specific scalability attributes of the formatted scalable encoded media bit-stream.

16 Claims, 11 Drawing Sheets

SYSTEM, METHOD, AND FORMAT THEREOF FOR SCALABLE ENCODED MEDIA DELIVERY

FIELD OF THE INVENTION

The present invention relates to the delivery of media data, and in particular, this disclosure provides a system, method, and format thereof for delivering any type of scalable encoded media to media destinations having a variety of receiving attributes.

BACKGROUND OF THE INVENTION

Users access the Internet today using devices ranging from handhelds to powerful workstations, over connections ranging from 56 Kbps modems to high speed 100 Mb/s Ethernet. Even though the available bandwidth, display and processing capabilities continue to grow, the heterogeneity and the spread of capabilities at any point in time are here to stay. On the other hand, as bandwidth and other factors grow, so does the richness of media that is delivered to users.

Under these circumstances, a rigid media representation format, producing decompressed content only at a fixed resolution and quality is clearly inappropriate. A delivery system based on such a compression scheme can only deliver content satisfactorily to a small subset of users interested in the content. The rest, either cannot receive anything at all, or receives poor quality and/or resolution relative to the capabilities of their network connections and/or accessing devices. The inability to cater to this diversity has been a determining factor that stunted the growth of new rich media, because such rich content can cater only to power users comprising a small fraction of the whole. Without adequate focus on seamless content adaptation, accessibility and usability of media will always be severely limited.

One known technique for providing media content to users having a variety of capabilities and preferences is to provide multiple versions of the media suiting a variety of capabilities and preferences. While this approach works with delivery models where the recipient directly connects to the media originator, for any other multi-hop, multi-recipient delivery scenario, too much redundancy and inefficiency is introduced, leading to wastage of bandwidth and storage. This is especially so, when the media creator wishes to provide a wide range of choices catering to a large consumer base, and therefore needs to maintain a large number of versions differing in a variety of ways.

In order to combat the above problem, scalable compression formats have been proposed. Scalable compressed representations can accommodate all users by automatically maximizing the multimedia experience for a given user's computing power and connection speed. By adapting rich media content written for high-end machines with fast connections, to less powerful machines with slower connections, the overheads involved in producing different versions as described above for different scenarios can be virtually eliminated. Furthermore, content created today at the highest possible quality, remains 'timeless' when represented in a scalable format, and the experience it provides gradually increases, as the power of machines and connection speeds improve.

One example of a scalable compressed representation is JPEG2000. JPEG2000 is a scalable standard for still images and endeavors to combine quality scalability and resolution scalability in a format specific to JPEG2000 compressed data, to enable distribution and viewing over a variety of connections and devices. However, in order to obtain the benefits of the scalability of the format, it is necessary to develop and deploy an infrastructure that specifically supports transcoding of JPEG2000 content and delivery to a heterogeneous recipient base.

In recent years, a great deal of attention has been focused on delivering streaming video over the Internet or wireless. Hence, video standards of MPEG-X (mostly MPEG-4) and H.26X families were developed that incorporate various forms of scalability for delivering media content such as streaming video to a heterogeneous recipient base. However, this type of scalable video over the Internet is limited to maintaining multiple versions for a few different types of connections, because complete infrastructures that support transport of scalable video formats are non-existent.

Any infrastructure, is expensive to deploy, and requires significant financial commitments from the patron companies or patron consortia. In order to guarantee constancy of the format it would also be desirable that the format the content is represented in be standardized. On the other hand, standards take several years to come into effect, typically much longer than is commensurate with the normal pace of change in the multimedia industry. As new types of media beyond traditional images, video and audio evolve; it would become more and more difficult to expect standards to support their representation. Even if scalable formats evolved for every new type of media, the inevitable difference in the structure of the content would necessitate use of different infrastructures for scalable delivery of different types of media. The expenses involved present a very formidable obstacle in adoption of such new media and supportability of its scalability features.

There are various types of bit-stream scalability that can be devised depending on the type of media. For example, SNR (quality) scalability refers to progressively increasing quality as more and more of the bit-stream is included, and applies to most types of media. Resolution scalability refers to fineness of spatial data sampling, and applies to visual media such as images, video, 3D etc. Temporal scalability refers to fineness of sampling in the time-domain, and applies to video and other image sequences. There are several types of scalability pertaining to audio, such as number of channels and sampling frequency and so on. In the future, with the evolution of newer, richer and more interactive types of media, there will be newer types of scalability that are, to date, unknown. A scalable bit-stream does not always have a single type of scalability. Different types of scalability can co-exist, so as to provide a range of adaptation choices.

In new rich media, different media elements are often bundled together to provide a composite media experience. According to one known technology, an image with audio annotation and some animation provides a composite experience of a presentation using three media elements (an image, an audio clip, some animation data). Composite rich media models such as this lead to newer types of scalability specific to the media, because certain non-critical elements of the composite may be dropped to accommodate other more critical ones within the limited resources of a recipient.

The present invention provides a system, method, and format thereof for scalable encoded media data delivery to a heterogeneous recipient base and that is not specific to the type of media being delivered thereby requiring a single delivery infrastructure for delivering all types of currently known media and future media.

SUMMARY OF THE INVENTION

A system, method, and format of delivery of encoded scalable media data are described. According to a first embodiment of the method of delivery, original scalable encoded media data is formatted into a format including first and second portions. The first portion corresponds at least to non-media type specific scalability attributes of the original encoded media data and data structure information of the second portion. The second portion corresponds to the original scalable encoded media data arranged in a non-media type specific indexable data structure having at least one dimension. In addition, information corresponding to receiving attributes of scalable encoded media by a media destination can be provided. The formatted original scalable encoded media data is transcoded using the data structure information prior to delivery to the media destination to generate a scaled version of the formatted original scalable encoded media data based on matching the scalability attributes and the receiving attributes, where the transcoded media data is adapted to the receiving attributes of the media destination.

According to a second embodiment of the method of delivery, a method of transcoding is described in which the formatted scalable media bit-stream including a plurality of bit-stream subsets is received including a first portion corresponding at least to non-media type specific scalability attributes of the original encoded media data and data structure information of the second portion and a second portion corresponding to the original scalable encoded media data arranged in a non-media type specific indexable data structure having at least one dimension. In addition, information corresponding to receiving attributes of at least one type of scalable encoded media by a media destination is received. Scalability attributes and the receiving information are compared and any of truncation, dropping, and rearranging of bit-stream subsets of the bit-stream is performed dependent on the comparison and using the data structure information to generate a scaled version of the formatted original scalable encoded media data adapted to the media destination.

One embodiment of the system of delivery of encoded scalable media data includes a media source, a media destination, and a transcoder. The media source provides scalable encoded media data in a format including first and second portions where the first portion corresponds at least to non-media type specific scalability attributes of the original encoded media data and data structure information of the second portion and the second portion corresponds to the original scalable encoded media data arranged in a non-media type specific indexable data structure having at least one dimension. The media destination provides information corresponding to receiving attributes of at least one type of scalable encoded media by the media destination. In another embodiment, receiving attributes information includes information corresponding to media destination preferences. The transcoder transcodes the formatted original scalable encoded media data prior to delivery to the media destination to generate a scaled version of the formatted original scalable encoded media data, based on matching the scalability attributes and the receiving attributes and using the data structure information.

A format for a scalable encoded media bit-stream including first and second portions. The first portion corresponds at least to non-media type specific scalability attributes of the original encoded media data and data structure information of the second portion and the second portion corresponds to the original scalable encoded media data arranged in a non-media type specific indexable data structure having at least one dimension.

DETAILED DESCRIPTION OF THE INVENTION

In general, the present invention is a system and method for scalable encoded media bit-stream delivery and provides a generic (i.e., non-media type specific) format for the scalable encoded media bit-stream. The system, method, and format provides seamless, flexible delivery to media destinations having a variety of receiving attributes such as receiving capabilities and preferences which is adapted based on the receiving capabilities of the media destination and media-specific and non-media specific scalability attributes of the formatted scalable encoded media bit-stream. Furthermore, the system and method is extensible to support adaptation and delivery of any new kind of scalable media that evolve in the future.

A scalable encoded media bit-stream is generally defined as an encoded bit-stream being made-up of a plurality of smaller encoded sub-sets of the bit-stream that when grouped can produce media representations having varying scales of a particular scalable attribute of the media bit-stream such as quality, resolution etc. For instance, if a scalable encoded bit-stream including a plurality of encoded sub-sets relates to resolution, then all of the encoded sub-sets will provide a full resolution representation. Lower resolution can be obtained by dropping sub-sets (in mid bit-stream) or truncating sub-sets (from the end of the bit-stream) and still lower resolution can be obtained by again dropping/truncating sub-sets. After dropping/truncating sub-sets the remaining bit-stream sub-sets are repacked to adjust for the positions of the dropped sub-sets. In general, the operation of dropping, truncating, and rearranging sub-sets is generally referred to as a transcoding operation.

It should be understood that according to the present invention, a scalable bit-stream can have more than one kind of scalability. Moreover, different types of scalability (e.g. signal-to-noise ratio (SNR), resolution, temporal, interactivity) can apply to different types of media. In addition, scalable encoded bit-streams contain nested tiers of scalability.

The generation of a scalable encoded media bit-stream is well known in the field of media delivery. For example, in JPEG2000 image compression, a scalable encoded media bit-stream can be generated by wavelet decomposition of an original media bit-stream to obtain blocks (referred to as sub-bands) of coefficients. The sub-bands of the coefficients are scanned in such a way so as to obtain a bit-plane by bit-plane encoding of the original media bit-stream wherein each encoded bit-plane is represented by a plurality of bitstream sub-sets. Other known techniques of generating scalable encoded media bit-stream include video compression, and audio compression. It should be further understood that the system, method, and format of the present invention is applicable to any scalable encoded bit-stream generated by any technique.

Figure 1:
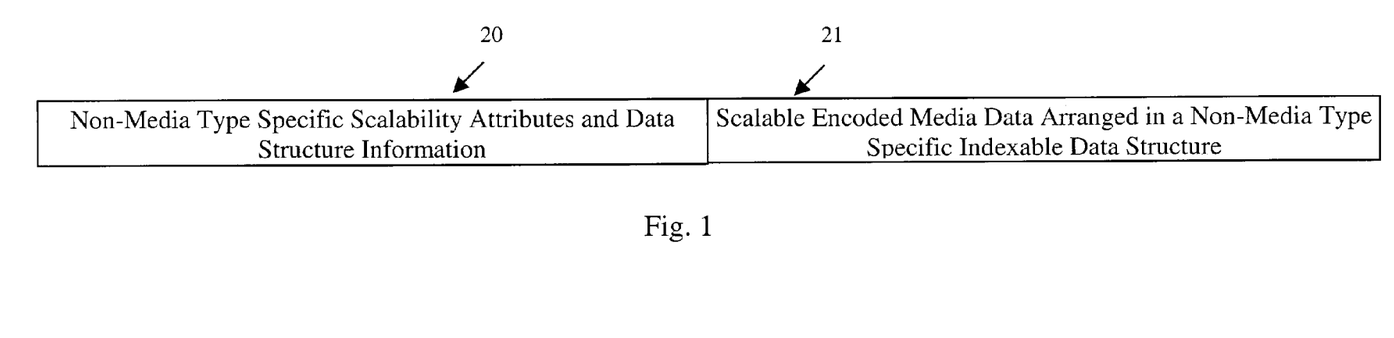
FIG. 1 shows a first embodiment of a non-media type specific format of scalable media data in accordance with the present invention.

FIG. 1 shows a first embodiment of a non-media type specific format for scalable encoded media data in accordance with the present invention including a first portion 10 and a second portion 11. The first portion 10 corresponds at least to non-media type specific scalability attributes. Non-media type specific scalability attributes, in general, include attributes common to all media types. For instance, non-media type specific scalability attributes can include but are not limited to size (corresponding to the size of the bit-stream), display resolution (required to display the content obtained from the bit-stream), SNR (a measure of fidelity of the content obtained from the bit-stream to the uncompressed version), and processing power (required to experience the media). In one embodiment, each attribute is associated with an n-byte code that uniquely identifies the attribute. Reserved codes can be used for standardized attributes that have universal meaning across media types, and other bytes can be set aside for future attribute type codes. Attributes can be expressed by standardized values to preserve uniformity across all media types and capabilities. In one embodiment, attributes can be quantized by a "decreasing" code value or "increasing" code value. The first portion 10 also includes non-media type specific data structure information of the second portion 11. In one embodiment, the data structure information relates to the dimensions of a multi-dimensional representation of the scalable encoded media bit-stream.

The second portion 11 corresponds to the scalable encoded media data arranged in a content independent indexable data structure. Specifically, no matter what the content of the encoded media data, it is arranged into a generic format according to the present invention. Arranging the encoded media data in this manner allows for performing generic transcoding in which the transcoding operation is performed without knowledge of the actual media content and without decrypting or decoding the media data thereby enabling a single infrastructure/transcoder to deliver many types of media content. In addition, the format simplifies transcoding operations such as truncation, bit-stream skips, and repacking to generate a scaled version of the encoded bit-stream without knowledge of the actual content or compression scheme previously applied to the encoded bit-stream. Moreover, since the content independent indexable nested format is not specific to any type of media, it can be used for both media that exists currently as well as future media types.

Figure 2A:
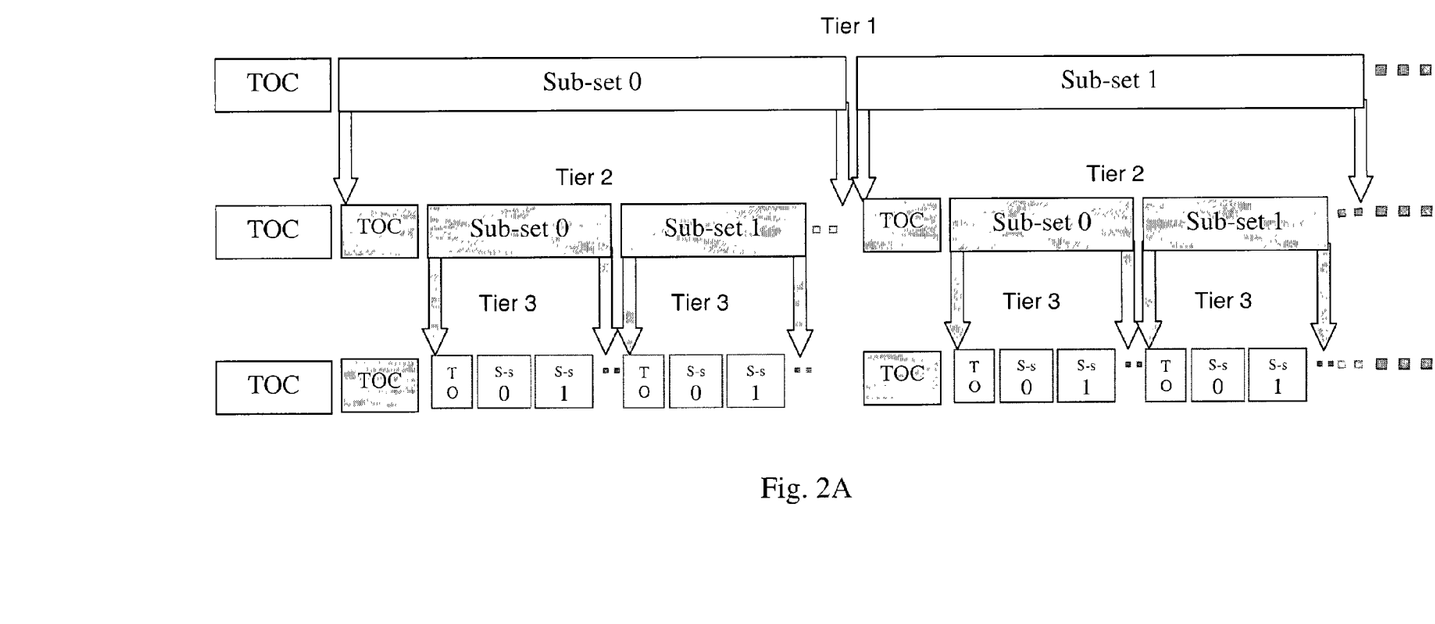
FIG. 2A shows an embodiment of media data formatted into a non-media type specific data structure having multi-tier scalability in accordance of the present invention.

In one embodiment, the scalable encoded media data is arranged as shown in FIG. 2A where each tier corresponds to a different type of scalability. The data is indexable using multiple TOCs where each tier is indexable by its corresponding TOC. In another embodiment, the second portion is indexed with a single TOC. For instance, as shown in FIG. 2A, a first tier of the bit-stream includes a first bit-stream encoded sub-set (Sub-set 0) and a second bit-stream encoded sub-set (Sub-set 1). As described above, scalability can be achieved by grouping sub-sets of the bit-stream to provide scalability to a particular tier. For instance, a first scalability might be obtained from only Sub-set 0, whereas a second scalability might be provided from the combined sub-sets of Sub-set 0 and 1. The type of scalability that the first tier provides depends on the actual content of the first and second Sub-sets. Each of the first and second bit-stream Sub-sets of the first tier can be further broken down into first and second bit-stream sub-sets of the second tier (Sub-sets 0 and 1). Again, the content of the second tier sub-sets determines what type of scalability provided by the tier. A third tier is similarly broken down. One example of this type of multi-tier scalable bit-stream is a JPEG2000 bit-stream. In one of the progression modes of JPEG2000 the highest tier corresponds to resolution scalability and within the resolution scalable sub-sets there are nested a second tier of signal-to-noise ratio (SNR) sub-sets. It should be noted that in the example shown in FIG. 2A, the TOCs (table of contents) is provided, in part, for random access and fast identification of sub-sets for dropping or truncating during transcoding operations.

Figure 2B:
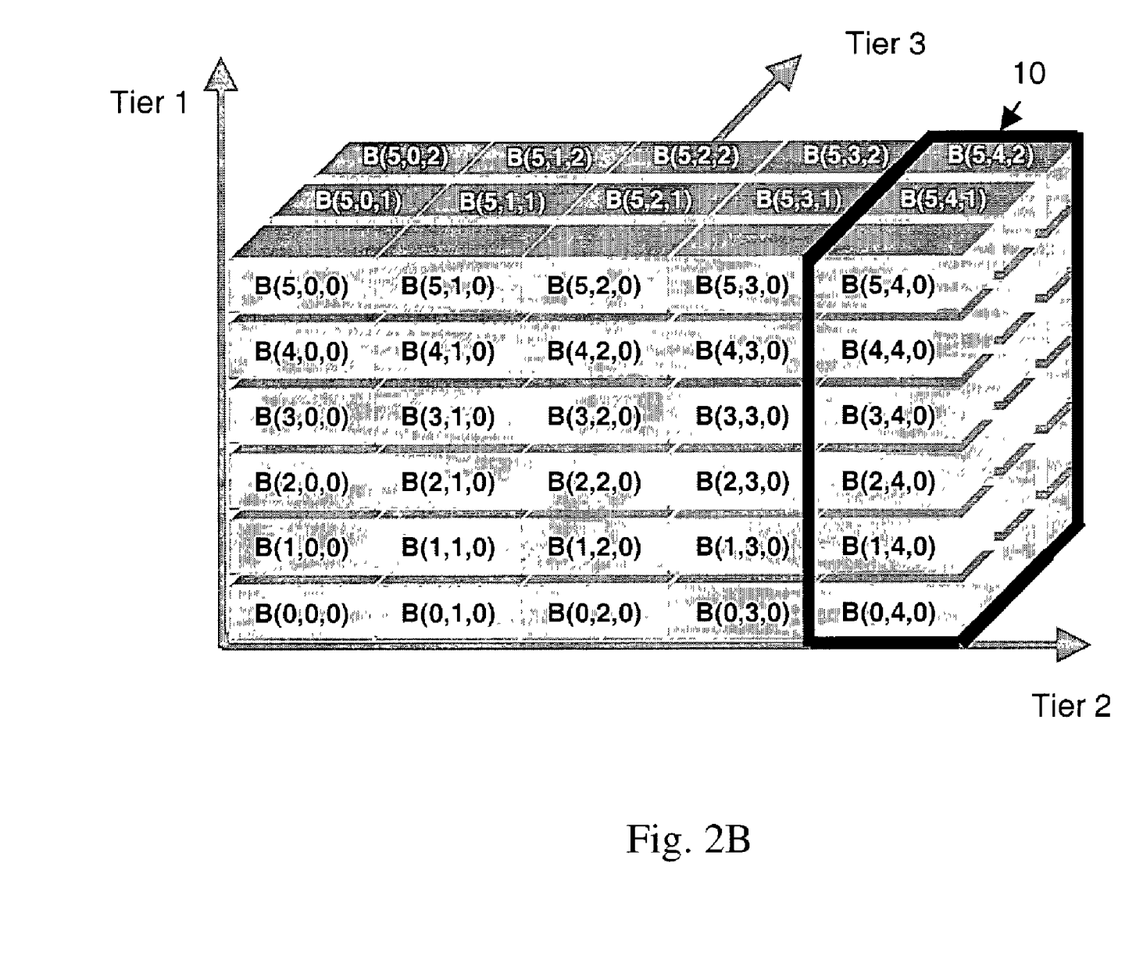
FIG. 2B shows an alternative representation of scalable encoded media data corresponding to the representation shown in FIG. 2A in accordance with the present invention.

FIG. 2B shows an alternate representation of the multi-tiered scalable encoded bit-stream shown in FIG. 2A including a plurality of bit-stream sub-sets B(x,y,z) arranged in a cube where each of the dimensions of the cube correspond to each tier of FIG. 2A. A given attribute can either decrease or increase along the dimension. For example if tier 1 corresponds to resolution, then resolution increases along the x dimension. In this representation, transcoding can be simply implemented by dropping layers and updating the TOCs appropriately. In other words, transcoding/scaling of the encoded bit-stream can be achieved by truncating rows or columns of the cube. For instance, if tier 1 corresponds to resolution, tier 2 corresponds to SNR, and tier 3 corresponds to interactivity, then if the sub-sets indicated by 10 are truncated, the encoded bit-stream would be scaled such that SNR is increased, but the resolution and interactivity are not scaled. In one embodiment, causality is maintained during encoding and encryption of media data In accordance with a second embodiment of the non-media specific format, media content passed around in each transmission instance is referred to as a parcel. Each parcel in the generic case may be comprised by multiple media components to provide a composite experience. For example, one component may be an image and a second component may be audio annotation that goes with it; both components are packaged together in a single parcel to provide an experience of image viewing with audio annotation. Each media component is a coded unit of data that may be represented in the scalable non-media specific format, along with a header containing its description. The overall media description for a parcel consists of the descriptions for the individual components in its header, while the overall parcel data consists of (scalable) coded data for the individual components.

Figure 3A:
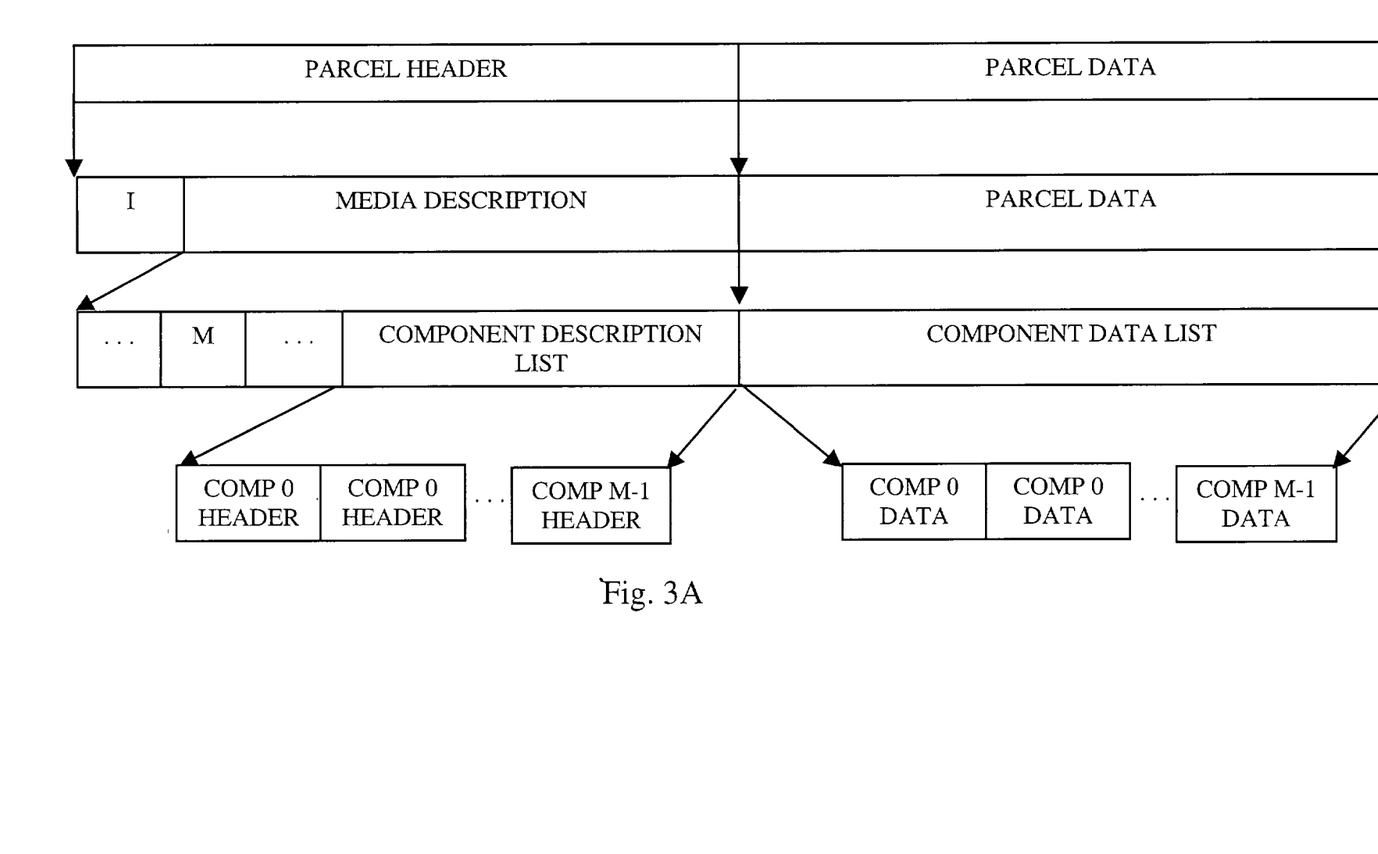
FIG. 3A shows a second embodiment of a non-media type specific format of scalable media data including parcel component and parcel data information in accordance with the present invention.

In general, in accordance with the second embodiment of the non-media specific format, each parcel includes two portions: the parcel header and the parcel data (FIG. 3A). In general, the parcel header portion contains, among other things, the number of media components, as well as the individual headers for each of the constituent components. The parcel data portion contains the encoded data for the individual components.

Figure 3B:
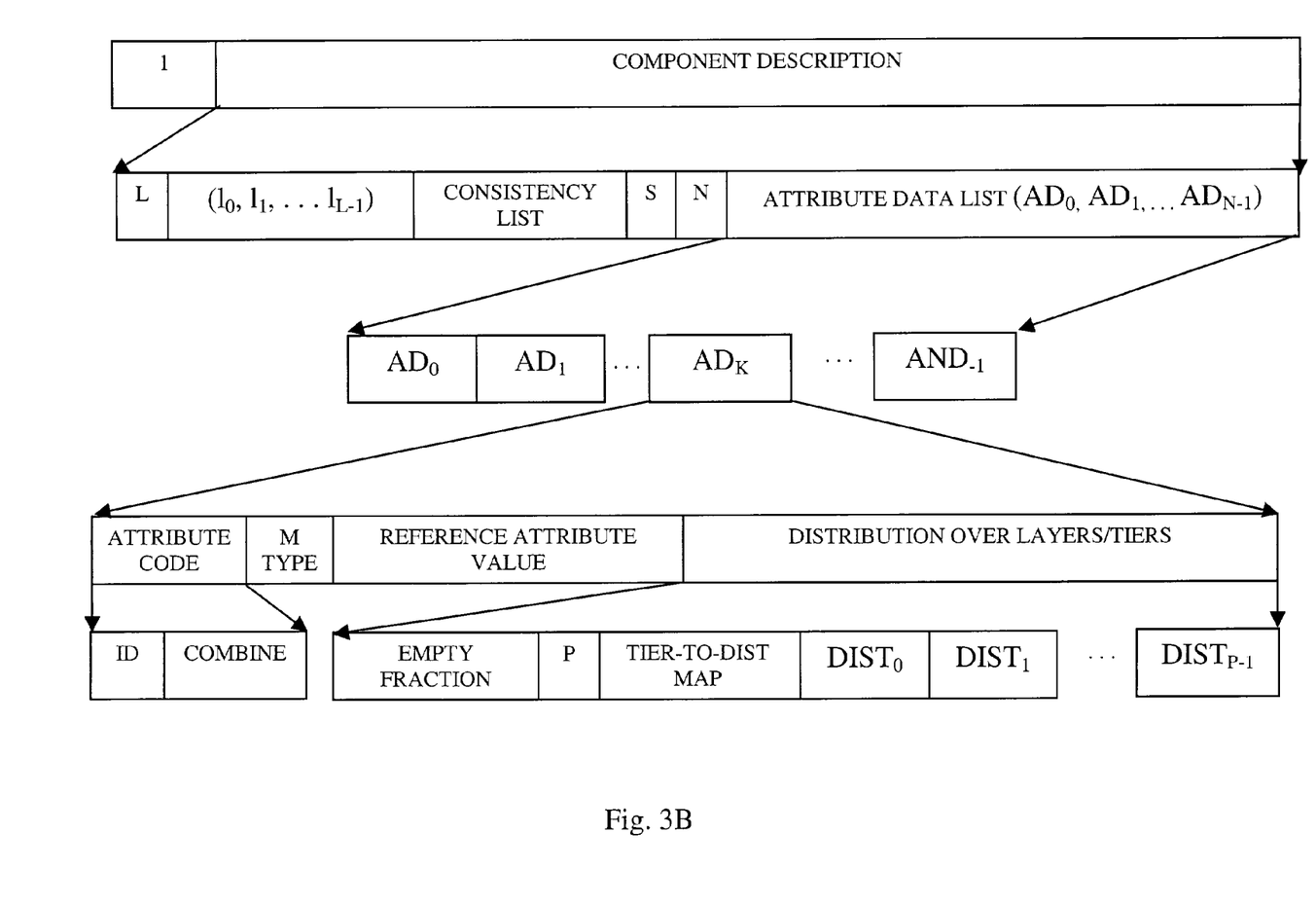
FIG. 3B shows an embodiment of a component header employed within the non-media type specific format of scalable media data of the present invention.

One embodiment of the format for each media component header is shown in FIG. 3B. The header starts with a flag specifying whether the media component is non-media type specific formatted in accordance with the present invention or not. If not, no transcoding is done, and the entire media parcel is forwarded as is to the outbound connection(s). There is no component description in the header in this case. If however the flag indicates that the parcel is scalable and non-media type specific format compliant, then the component description follows in the header.

The component description contains L, the number of nested scalability tiers which corresponds to the number of dimensions of the cube as shown in FIG. 2B followed by $l_1$, a list containing the number of layers in each tier i which corresponds to the number of rows in the cube. Next comes a list called the consistency list, consisting of a subset of tiers that are important for preserving consistency across parcels of the same type to be described in detail herein below.

Following the consistency list is a single bit flag, referred to as the Scalability_Flag, which describes whether the data part is in a scalable format, or whether there are multiple independent versions packaged in the bit-stream. In other words, the same media component header can apply to both incremental scalable bit-streams and multi-version scalable bit-streams. In general all transcoding operations for incremental and multi-version scalable bit-streams are the same. But in certain cases, it is possible for the transcoder to increase bandwidth efficiency by knowledge of the fact that the scalable bit-stream contains multiple independent versions.

The next field is N, the number of attributes relevant to the media component, followed by a list of required data for each of them. In general, attributes are expressed quantitatively in terms of non-negative numbers, referred to as attribute values. For reserved attributes, the quantification is also standardized along with the code. For example, size can be expressed in KBytes, display_resolution may be expressed as the diagonal width of the screen in number of pixels, processing_power may be denoted by CPU_speed× Number_of_processors, and so on. The method used to quantify the reserved attributes is standardized so that uniformity across different types of media and how capabilities are conveyed is preserved. For most known attributes, the value is either non-decreasing or non-increasing with layers. Thus, as more layers are added to a scalable media, the attribute values usually change monotonically.

The data for each attribute first contains the unique Attribute_code field that identifies this attribute. In one embodiment, the Atribute_code actually consists of two fields, Attribute_ID and Attribute_combination. The Attribute_ID is a unique identifier, and Attribute_combination is a field that describes how the attribute value changes when combined with another media component having the same attribute. Possible values are additive, maximum, minimum and so on. For example, size is always additive in combination, but display_resolution is the maximum of individual components after combination. That is, when two or more media components are combined, the size required is the sum of the sizes required for all of them. On the other hand, the display_resolution required is the maximum of all of them. Overall, the unique Attribute_code not only identifies the attribute, but also defines its behavior when combined with another component.

The next field is the Attribute_Monotone_Type, which indicates how the attribute value changes with increase in layers. Possible types are monotonic non-decreasing, monotonic non-increasing, non-monotonic with the number of layers.

The next field in attribute data is the Reference_Attribute_value. This is the numeric reference value of the attribute, which when multiplied with distribution values that follow later, yield the attribute value for various layer drop options.

The Reference_Attribute_value field is followed by the Distribution over layers/tiers field which is a specification of how the attribute value changes when layers are dropped. This specification is referred to as a distribution because of its parallels with the cumulative distribution of a random vector. The specified distributions can either be exact or approximate.

In one embodiment, the exact distribution is similar to a multi-dimensional cumulative distribution. As an example, if there are L nested tiers with $l_i$ layers in the ith tier, the Distribution field is a L-dimensional matrix of size $l_0 \times l_1 \times \ldots \times l_{L-1}$, where the $(j_0, j_1, \ldots, j_{L-1})^{th}$ element denoted $C(j_0, j_1, \ldots, j_{L-1})$, for $j_0=0,1,\ldots,l_0-1; j_1=0,1,\ldots,l_1-1;\ldots; j_1=0,1,\ldots,l_1-1;\ldots; j_{L-1}=0,1,\ldots,l_{L-1}-1$, is a number specifying a multiplier of the reference attribute value, to obtain the component's attribute value if only up to $(j_0, j_1, \ldots, j_{L-1})$ layers are transmitted, along with an optional empty multiplier $C_\phi$ specifying a multiplier of the reference attribute value, to obtain the component's attribute value when the entire component is dropped, i.e. none of the layers are transmitted. The default empty multiplier is 0. The total number of multipliers that need to be sent is therefore $1+l_0 \times l_1 \times \ldots \times l_{L-1}$. Note that the Reference_Attribute_value multiplied by the last multiplier $C(l_0-1, l_1-1, \ldots, l_{L-1}-1)$ yields the full attribute value, or the value of the attribute the media would have if it were transmitted as is without dropping any layer. Also, for a monotonic non-decreasing type attribute, the multipier $C(j_0, j_1, \ldots, j_{L-1})$ would be analogous to the cumulative distribution of a multi-dimensional discrete random vector, if the Reference_Attribute_value were equal to the attribute value for the full media with no layer drops, i.e. $C(l_0-1, l_1-1, \ldots, l_{L-1}-1)=1$.

Figure 3C:
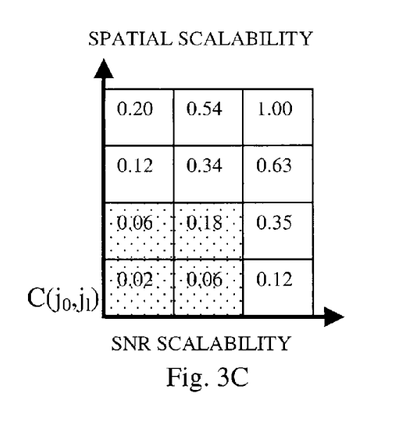
FIGS. 3C–3F show examples of attribute distribution specifications employed within the non-media type specific format of scalable media data of the present invention.
Figure 3D:
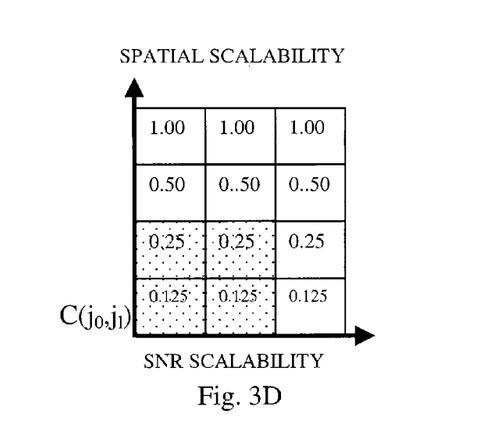

In an exemplary embodiment for the first two tiers of JPEG2000 RLCP progression mode, the size and display_resolution attribute distribution specifications may look as in 3C and 3D. Both are non-decreasing monotonic. Here we have four spatial scalability layers nested with three SNR scalable layers each. Note that in FIG. 3D, the display resolution attribute does not change with SNR scalable layers. As a result of transcoding, if a SNR layer and two Spatial layers are dropped, the size attribute of the transcoded bit-stream shown shaded in FIGS. 3C and 3D would be 0.18 times the reference size value, while the display_resolution attribute would be 0.25 times the reference display_resolution value.

In one embodiment, the cumulative distribution is specified exactly or approximately using products of one or more lower-dimensional marginal distributions. In this case, the element $C(j_0, j_1, \ldots, j_{L-1})$ is obtained approximately as $\hat{C}(j_0, j_1, \ldots, j_{L-1})$ using a product combination of marginal distributions. That is, the specification involves P lower dimensional cumulative distributions $C_i(.)$ that cover L dimensions together: $\hat{C}(j_0, j_1, \ldots, j_{L-1}) = C_0(\ ) \times C_1(\ ) \times \ldots \times C_{P-1}(\ )$. The empty fraction $C_\phi$ is transmitted separately.

Whether the distribution is exact or approximate, the Distribution description contains first the empty fraction $C_\phi$, followed by the number P indicating the number of product distributions specified, followed by a list of L P-ary elements, one for each of L tiers, indicating which tier map to which distribution. Following this are the actual specifications of the P distributions in order.

Figures 3E, 3F:
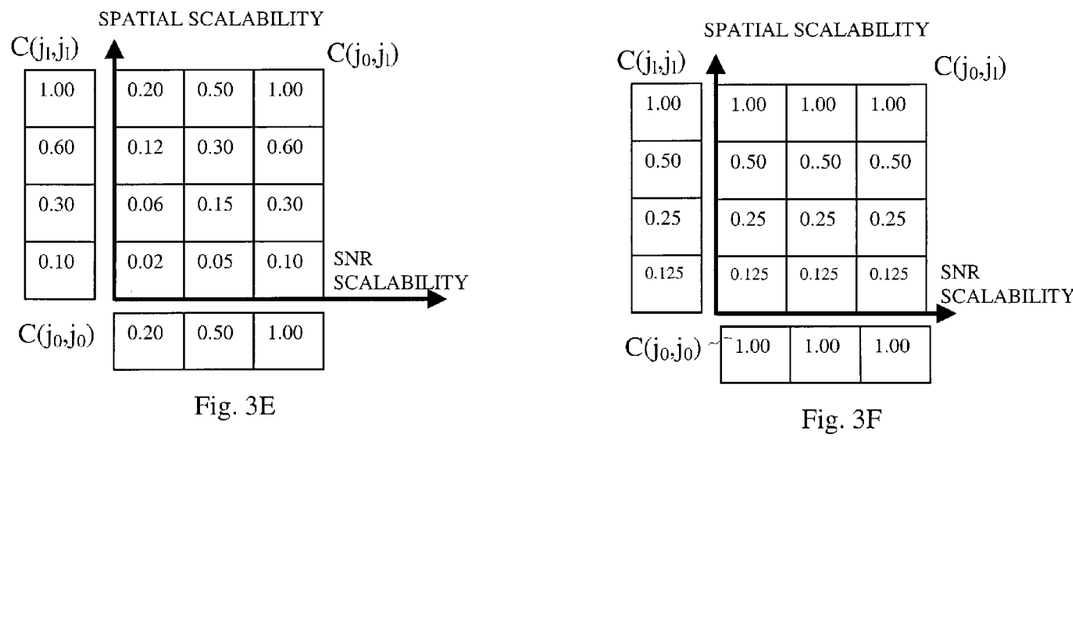

In one exemplary embodiment for the JPEG2000, the approximate specifications using two one-dimensional marginals and the eventual approximate distributions generated can be embodied as shown in FIGS. 3E and 3F. As seen in FIG. 3F, the display resolution is represented exactly using the approximate approach, while the size is represented only approximately.

Figure 4A:
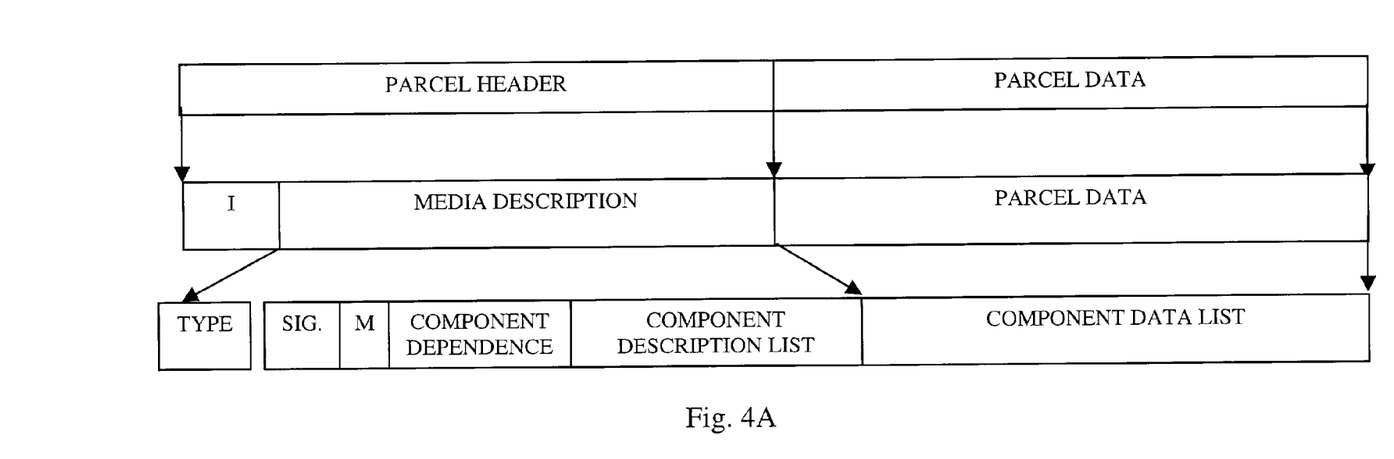
FIG. 4A shows a third embodiment of the non-media type specific format having a component dependence matrix D that defines the manner in which components are dependent.

FIG. 4A shows another embodiment of the non-media type specific format having a component dependence matrix D that defines the manner in which components are dependent. In particular, components may or may not be excluded during transcoding. Certain components in the media must be included after transcoding even if it is only the lowest scalability layer B(0,0, ... ), while certain others may be dropped entirely. Furthermore, depending on the media, if one component is included or excluded, certain other(s) must be included or excluded too. All this information at the component level is conveyed in terms of a Component Dependency Matrix.

Figure 4B:
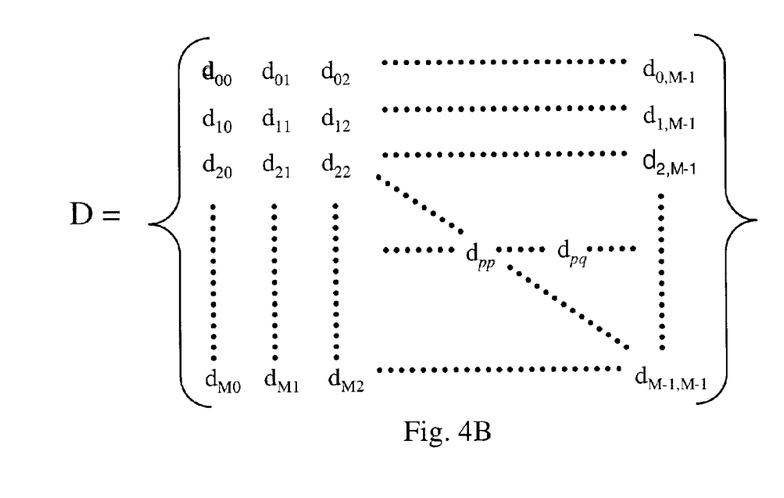
FIG. 4B shows an example of a dependence matrix D in accordance with the present invention.

FIG. 4B shows an example of a matrix D. In one embodiment, if there are M components in a media parcel, the component dependency rules are specified in terms of an M×M matrix D. The diagonal elements $d_{ii}$ can be binary and specify whether the ith component must be included, even though it is only the lowest layer after transcoding $d_{ii}=1$ indicates that the ith component must be included, while $d_{ii}=0$ indicates that the ith component may be dropped if needed. The non-diagonal elements $d_{ij}$, $i \neq j$, are 5-ary and specify whether the jth component must be included or excluded if the ith component is included or excluded $d_{ij}=0$ indicates that there are no dependencies between the ith component and the jth component; $d_{ij}=1$ indicates that if the ith component is included the jth component must also be included; $d_{ij}=2$ indicates that if the ith component is included the jth component must be excluded; $d_{ij}=3$ indicates that if the ith component is excluded the jth component must be included; and $d_{ij}=4$ indicates that if the ith component is excluded the jth component must also be excluded.

Figure 5A:
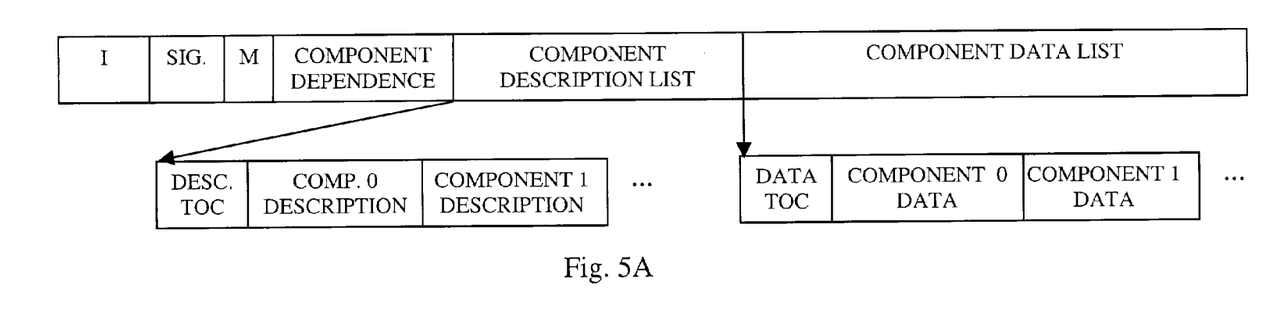
FIGS. 5A–5C show non-media type specific formats having different type fields.
Figure 5B:
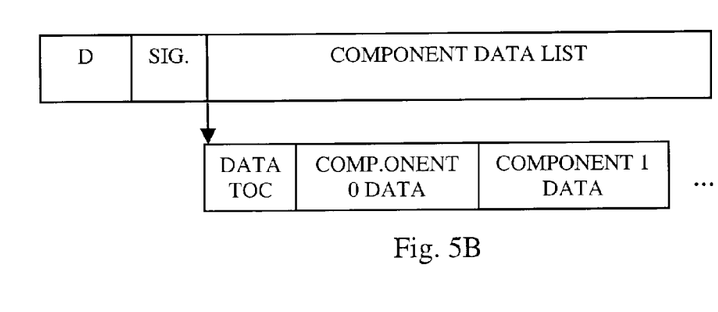
Figure 5C:
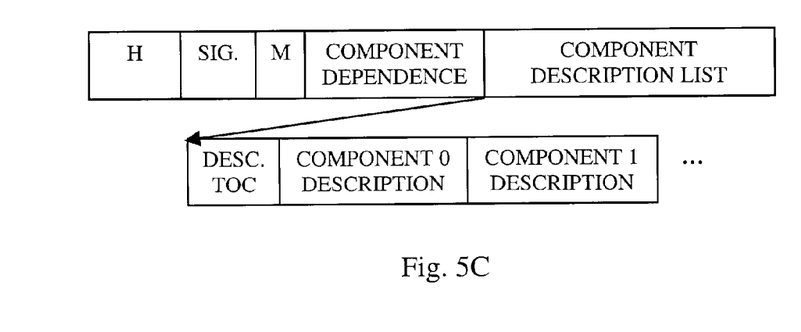

FIG. 4A also shows a media description TYPE field which can be one of three types, defined by the value of the Type field. Type=I (Integrated) indicates an integrated parcel with media descriptions and data. FIG. 5A shows the Type=I format. FIG. 5B shows a Type=D (Data only) format which indicates a parcel with no descriptions only data. FIG. 5C shows a Type=H (Header only) format which indicates a parcel with only descriptions and no data.

The signature field (SIG. in FIGS. 5A–5C) uniquely identifies the parcel class (type) and follows the type field. The transcoder stores for future reference in its internal memory, all the header information as well as the layer drop decisions made for a parcel, indexed by its signature. Once a signature has been registered in the transcoder, Type D parcels can be sent, in which case, the media description (header information) corresponding to the signature in the parcel is looked up in the transcoder's internal memory. The description and decision information stored for each signature is updated every time a new parcel with the same signature (class) is routed. For Type I and H parcels, the new media description in the current parcel replaces the transcoder's internal stored description, while for Type I and D parcels, the transcoding decisions made for the current parcel replaces the transcoder's internal stored decision for the class. The stored information enables use of Type D parcels, as well as allows maintaining consistency of transcoding, described herein below.

For a Type I or H parcel with header data, the signature field in the parcel header is followed by a specification of the number of media components, followed by dependency data for the components referred to as Component Dependency, followed by the list of individual media component headers each in the format shown in FIG. 3B. For a Type I parcel, this parcel header is followed by the list of the actual coded scalable data for the components each in the meta-bit-stream-format of FIG. 2A. For a Type H parcel, the parcel ends at the end of the header. For a Type D parcel there are no headers, but it only contains the list of scalable data components each in the format of FIG. 2A.

It should be noted that given the attributes and their values for the individual components, the attribute values for the overall parcel can be obtained. The attribute list for the overall parcel contains the union of all the attributes specified for all its components together. Furthermore, when the same attribute occur in one or more components, the combination type defined in the Attribute_Combination field of Attribute_code ("COMBINE" field in FIG. 3B) determines the overall value. For example, if Attribute_combination=additive, the overall attribute value is the sum of attribute values of individual components; if Attribute_combination=maximum, the overall attribute value is the maximum of the attribute values of individual components. The overall attribute values of the transcoded parcel are used in the transcoding operation to decide which layers from which components to drop in order to satisfy the imposed by the outbound constraints.

Figure 6:
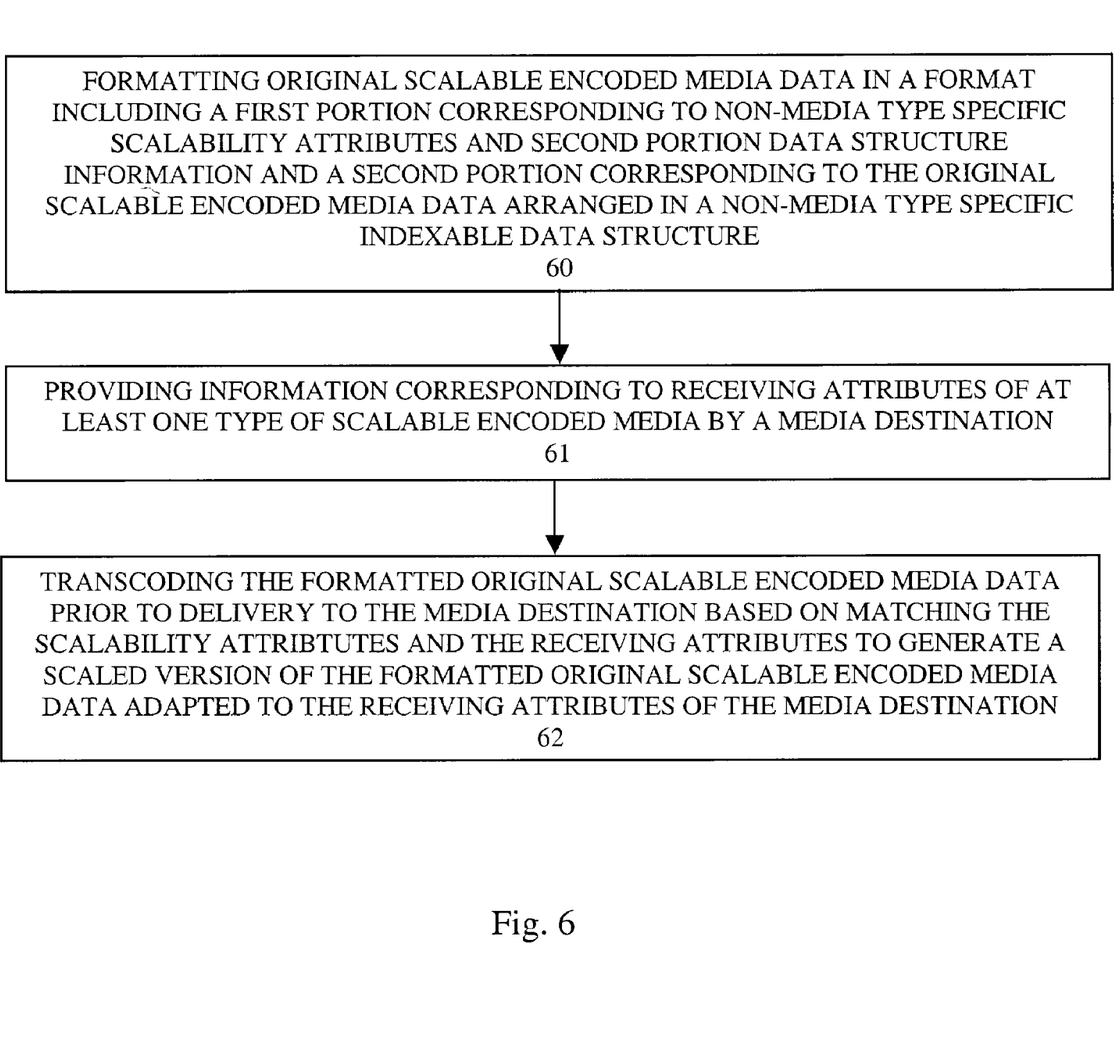
FIG. 6 shows a first embodiment of a method for scalable encoded media delivery.

FIG. 6 shows a first embodiment of the method of delivery of scalable encoded media data in accordance with the present invention. According to this embodiment, original scalable encoded media data is formatted in a format that includes first and second portions as shown in FIG. 1. Specifically, the media data is formatted (60) to include a first portion corresponding to non-media type scalability attributes and second portion data structure information and a second portion corresponding to the original scalable encoded media data arranged in a non-media type specific indexable data structure (FIGS. 2A and 2B). In addition, information corresponding to receiving attributes of a media destination of any type of scalable encoded media is provided (61). The formatted original scalable encoded media data is then transcoded prior to delivery to the media destination based on matching the scalability attributes and the receiving attributes to generate a scaled version of the formatted original scalable encoded media data adapted to the receiving attributes of the media destination (62).

It should be noted that receiving attributes (also referred to as Outbound Constraints) of the receiving destination and any intermediate link are standardized (similar to the scalability attributes included within the non-media type specific format of the present invention) so that they can be conveyed to a transcoder unambiguously so as to enable comparison between the scalability attributes and the receiving attributes. In one embodiment, the specifications of the receiving attributes are based on constraints on definable multivariate functions called measures of the attributes. Definable measures are essentially linear combinations of products of simple univariate functions of attribute values. According to one example of multi-variate functions, the following is defined: (i) the number of product terms N in the combination, (ii) the number of elements $n_i$ in each product term, (iii) the attribute codes for the attributes $a_{ij}$ in each product term, (iv) the function codes for certain simple univariate functions $f_{ij}(.)$ on the attribute values, and (v) multipliers $\lambda_i$ for the linear combination. Given the defined parameters of the functions, the measure can be expressed as shown in Eq. 1:

$$\sum_{i=1}^{N} \lambda_i \prod_{j=1}^{n_i} f_{ij}(a_{ij}) \quad \text{Eq. 1}$$

where $f_{ij}(x)$ are simple univariate functions like $x$, $x^2$, $x^{-1}$, $\log(x)$, $e^x$, etc., codes corresponding to which are to be included in the standard specification. Constraints are next imposed on the above-defined measures. They can be of two types:

Limit Constraints: The outbound constraints most often consists of specific limiting values for attribute measures, referred to as limit constraints. These constraints are specified as maximum and/or minimum supportable values for the receiving destination for the measure. When both the maximum and the minimum are specified for an attribute measure we have a range of supportable values for it. For instance, an example of a limit constraint is: size/latency<300 KB/s. Here size is an attribute, but 1/latency is specified in outbound constraints as a multiplier. Overall this indicates a bandwidth restriction on received media by the receiving destination. Another example is: display resolution<800 diagonal pixels.

Optimization Constraints: It is also possible to specify constraints in terms of a requested minimization or maximization of attribute measures In this case, the description consists of whether minimization or maximization of the measure is desired. The most important example of such a constraint occurs in rate-distortion optimization, where a measure like mean_squared_error+$\lambda$.size is minimized. Here the size attribute corresponds to rate (R), while the mean_squared_error attribute corresponds to distortion (D).

It should be noted that in general, transcoding (62, FIG. 6) can be implemented as simple truncation of bit-stream sub-sets, repacking the bit-stream and updating the TOCs appropriately, dependent on the comparison of the scalability attributes and the receiving attributes and does not require decoding or decrypting content in order to transcode due to the arrangement of the scalable encoded media data into the non-media type specific data structure. Sub-sets are dropped from the outer end in each tier (FIG. 2A). Referring to the alternate representation shown in FIG. 2B, outer rows and columns are dropped.

Figure 7:
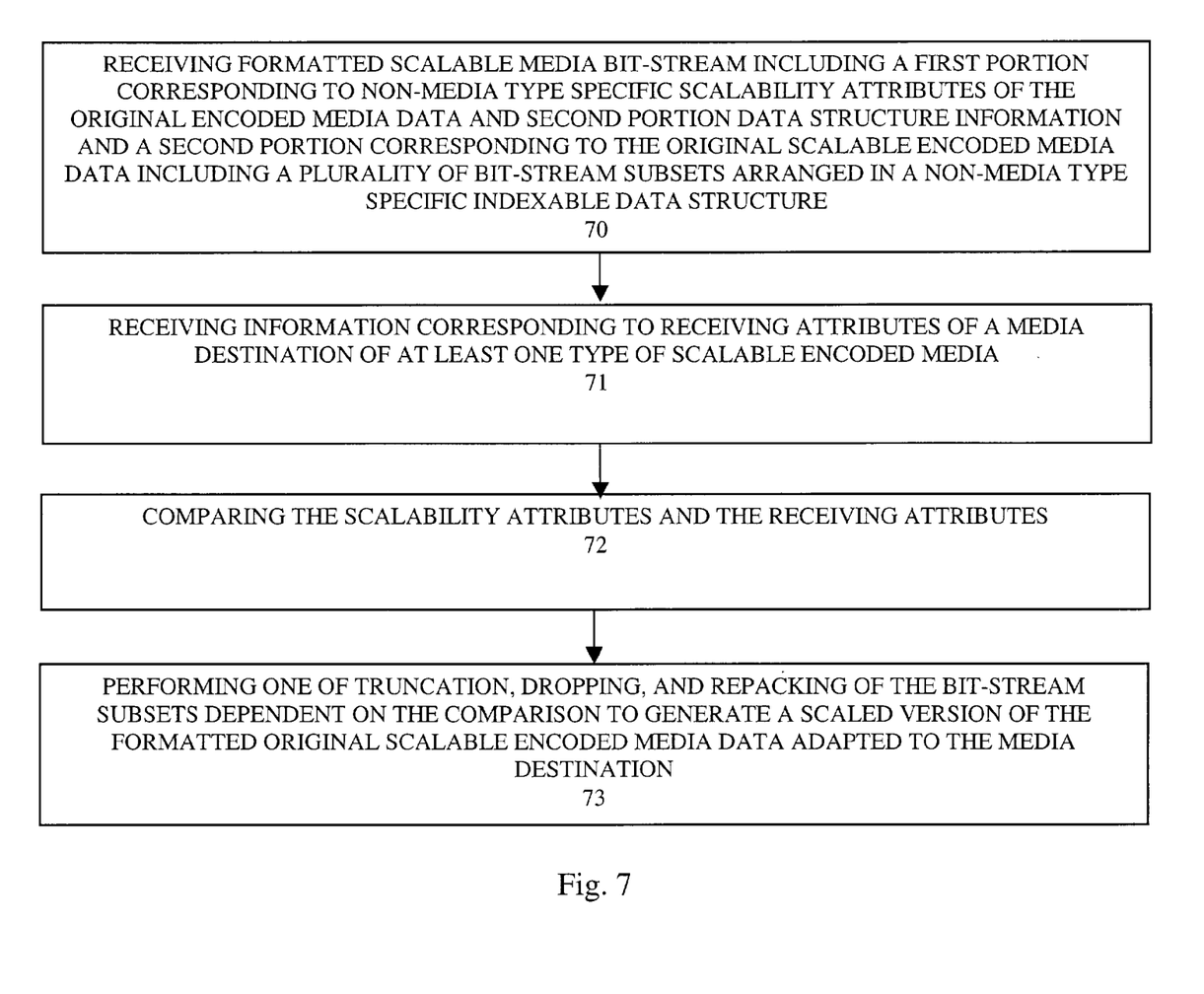
FIG. 7 shows a first embodiment of a method of transcoding.

In one embodiment, transcoding is performed according to the method shown in FIG. 7. As shown, media data in the format including first and second portions (70) as described above is received and receiving attributes (71) are received. The scalability attributes and the receiving attributes are compared (72) and one of truncation, dropping, and repacking of the bit-stream subsets are performed dependent on the comparison to generate a scaled version of the formatted original scalable encoded media data adapted to the media destination.

In an alternate embodiment, each receiving attribute measure, is compared to the formatted media data first portion (e.g., the media component description) to see if there is a corresponding scalability attribute. If one of the attributes does not occur in the descriptions of any of the media components, the receiving attribute measure is simply discarded as invalid because no transcoding using this attribute is possible.

For each valid receiving attribute measure (i.e., having a matching scalability attribute within the first portion of the formatted media data) specified with a limit constraint a full measure value of the overall packet is compared to the limit constraint to see if it falls within the range of the limit constraint. The full measure value of the formatted media data is derived from full attribute values for the formatted media data, which in turn are obtained by combining attributes for media components using the Attribute_combination type field of the Attribute_code (FIG. 3B). If none of the full measure values exceed the range of the outbound limit constraints, no transcoding is performed and the formatted media data is forwarded or transmitted. If at least one of the full measures is out of range of the limit constraints, transcoding is performed such that sub-sets (i.e., outer rows or columns as shown in FIG. 2B) from one or more media components by truncation, removal and repacking.

It should be understood that determination of which row or column to drop from which components can be implemented in a variety of ways, ranging from simplistic approaches to approaches involving complex optimizations. For example, if the Attribute_Monotone_Type field included in the component headers indicates the attribute is monotonic (non-decreasing or non-increasing), the simple approach of it dropping rows or columns can be performed. Alternatively, complex relationships between components can be developed in order to determined which sub-sets to drop.

The optimization constraints within the receiving attributes, if specified, are a lower priority than limit constraints. Among the choices that do not violate the limit constraints, the transcoder chooses the one that maximizes or minimizes the measure value. This can be particularly useful for selecting optimum layers based on a rate-distortion criterion (i.e. the traditional D+$\lambda$R), or selecting optimum layers based on user's relative preferences of one attribute over the other.

In one embodiment, once the decision has been made which sub-sets to drop from which components, the transcoder drops the sub-sets in the bit-stream, updates the appropriate TOCs, and truncates the attribute distribution matrixes based on dropped sub-set, before sending out the transcoded media data. If the data is of multi-version type and the transcoder is the last in the chain before it reaches the receiving destination, then the transcoding operation comprises extracting only the desired atom, and discarding the rest.

In the case in which multiple packets are bound for the same receiving destination, it may not be practical to include the media descriptions in each packet, and expect the transcoder to drop layers as appropriate. For example, if a consumer receives one presentation slide at a different resolution than the next, the media experience would be diminished. Hence according to an alternative embodiment, a common media description is used for a class of packets, typically of the same type. In particular, during transcoding the media description data is stored as well as the transcoding decisions, for a registered class indexed by an identifying signature (SIG. field, FIG. 4A). If formatted media data containing description data is received (Type I or a Type H packet, FIGS. 5A–5C) for a class for the first time, an entry is created in a buffer corresponding to the given signature. If the given signature already exists in memory, it is overwritten. Next, if a Type D packet belonging to the same class is sent, with only the signature in lieu of the media descriptions, the descriptions are checked, the layer drop decisions are made, and new decisions are stored in memory for the class. If a Type H packet is sent, the descriptions stored for the class are simply updated. If a Type I packet is sent, first, the packet description in memory corresponding to the given signature is updated; next, the layer drop decisions are made using the new descriptions; finally, the new decisions are stored in memory for the class. For Type D and Type I packets of a class the decision is stored for future consistency.

Consistency refers to a constraint as per which, the layer drop profile for each component is left unchanged from one packet to the next for the list of tiers mentioned in the consistency list of the component's header (FIG. 3B). In one embodiment, the consistency list contains a subset of all tiers. For the consistent tiers of a component, the number of sub-sets dropped are the same as the decision made for the previous packet, stored in memory for the class. This is an additional constraint that the sub-set drop decision mechanism can adhere to. In the decision making phase of transcoding, the tiers in the current stored consistency list for a class are maintained the same as the pre-stored decisions for the class. Thus, for a Type I packet, based on the order of operation as previously mentioned, the new consistency list is used in the decision making phase instead of the old one, because the description is updated before the decisions are made, even though the previous formatted media data's decisions are still used as reference.

The consistency mechanism can ensure consistency in delivery of media data belonging to the same class, while still allowing adaptation based on changing descriptions for same type of formatted media data and changing receiving attributes (such as bandwidth), by permitting change in layer drops for tiers not included in the consistency list.

According to the alternative embodiment of the method as described above, each signature remains in storage until it is dropped as a result of not being used. In one embodiment, a circular buffer maintains an ordered list of most recently used signatures. When a certain signature has not been used for while it can be eventually replaced by a new signature.

Figure 8:
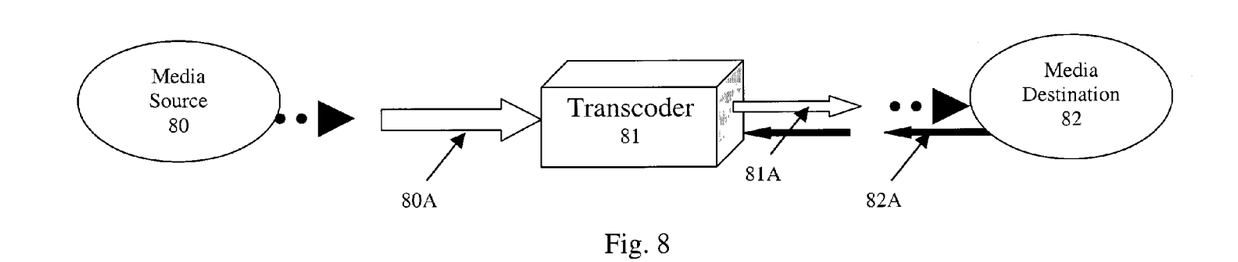
FIG. 8 shows a first embodiment of a system for scalable encoded media delivery.

FIG. 8 shows a first embodiment of the system of the present invention for scalable encoded media data delivery including a media source 80, a transcoder 81, and a media destination 82. The media source 80 provides scalable encoded media data 80A in a format including a first portion corresponding at least to non-media type specific scalability attributes of the original encoded media data and data structure information of a second portion and the second portion corresponding to the original scalable encoded media data arranged in a non-media type specific indexable data structure having at least one dimension. The media destination 82 provides information corresponding to receiving attributes 82A of the media destination of at least one type of scalable encoded media. The transcoder 81 transcodes the formatted original scalable encoded media data prior to delivery to the media destination 82 based on matching the scalability attributes and the receiving attributes to generate a scaled version 81A of the formatted original scalable encoded media data.

Figure 9:
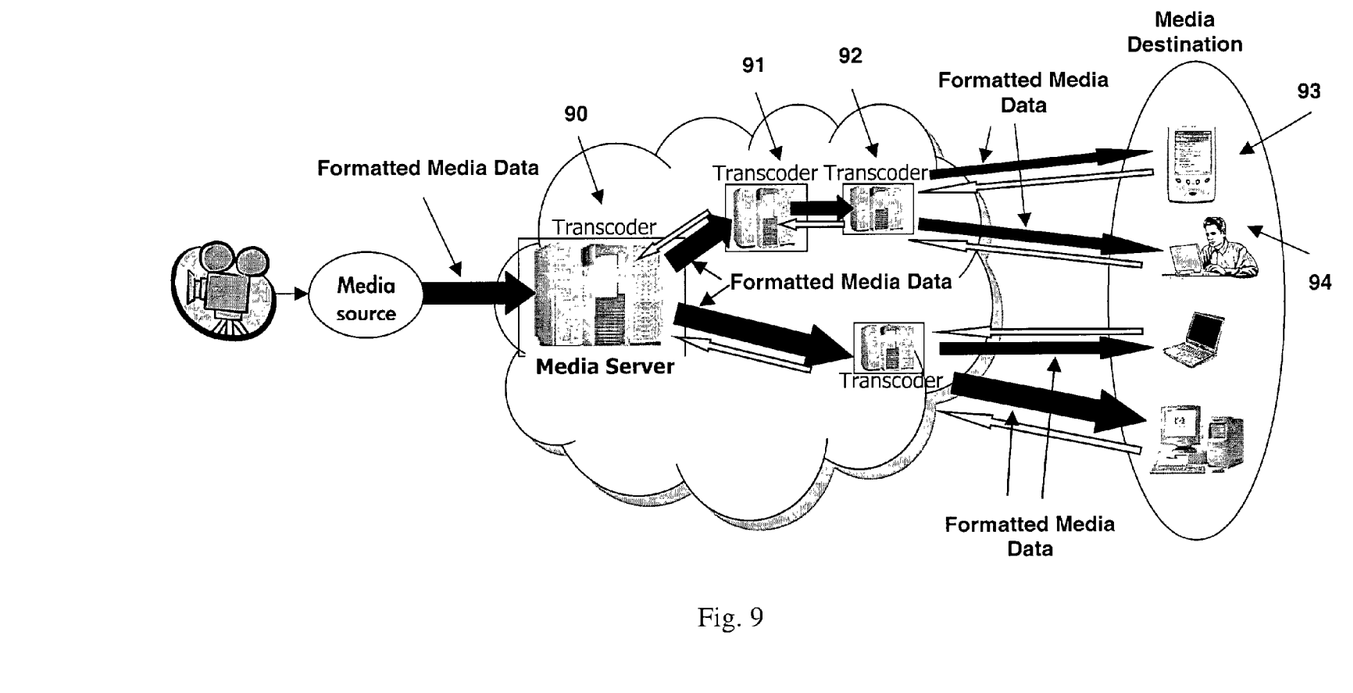
FIG. 9 shows an example of a structure for implementing the system and method of the present invention.

In general, the transcoder may be connected directly to the media in which case the media destination directly provides (or the transcoder senses) the receiving attributes to the transcoder thereby enabling the transcoder to provide the scaled version of the formatted data. Alternatively, the transcoder may receive or sense aggregated capabilities of all downstream media destinations. In this case, the scalable encoded media data is delivered to the media destinations based on their aggregated capabilities. For instance, FIG. 9 shows a network including a plurality of transcoders each performing transcoding on the formatted media data in accordance with the present invention and dependent on the aggregated receiving attributes of the downstream media destination receiving attributes (white arrows). Note that the single bit-stream of formatted media data generated by transcoders 90 and 91 will provide formatted media data that is adapted to the receiving attributes of both of the receiving destinations 93 and 94 and transcoder 92 generates individual formatted media data bit-streams each adapted to the capabilities of one of receiving destinations 93 and 94.

In one embodiment the transcoder can be embodied within any one of media servers, midstream routers, or edge servers and can be implemented in any combination of hardware, software and firmware.

Figure 10:
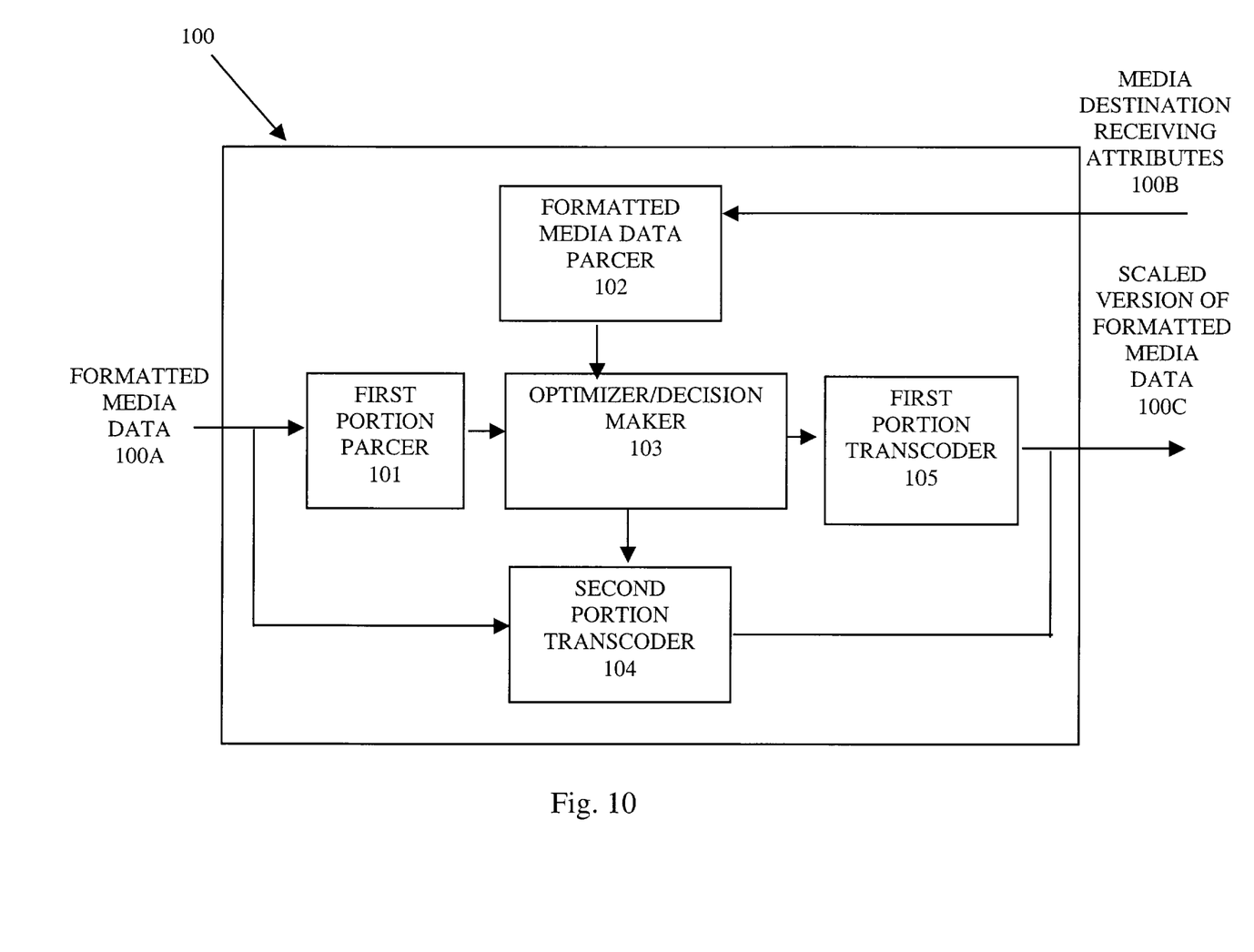
FIG. 10 shows a first embodiment of a transcoder in accordance with the present invention.

FIG. 10 shows one embodiment of a transcoder 100 for receiving formatted media data 100A and media destination receiving attribtutes 100B and generating a scaled version of the formatted media data 100C. The transcoder includes a first parser 101 for receiving and parcing the first portion 20 of the formatted media data (FIG. 1). The transcoder further includes a second parcer 102 for receiving and parcing the media destintation receiving attributes 100B. Each of the parcers 101 and 102 parce out the desired attribute data and information and provide it to the Optimizer/Decision Maker 103. The transcoder 100 further includes first portion sub-transcoder 104 and second portion sub-transcoder 105. The Optimizer/Decision Maker 103 provides control to both of the sub-transcoders thereby causing the transcoders to either transcode (i.e., truncate, remove, repack bit-stream sub-sets) each of the first and second portions of the formatted media data to generated scaled version of the formatted media data 100C including a scaled version of each of the first and second portions.

Hence a system, method, and format for delivery of scalable encoded media data is described that is media type and content type independent thereby providing a universal delivery system, method, and format for all current types of media and any future media.

In the preceding description, numerous specific details are set forth in order to provide a thorough understanding of the present invention. It will be apparent, however, to one skilled in the art that these specific details need not be employed to practice the present invention. In addition, it is to be understood that the particular embodiments shown and described by way of illustration is in no way intended to be considered limiting. Reference to the details of these embodiments is not intended to limit the scope of the claims.

We claim:

1. A method of delivery of encoded scalable media data having associated media content comprising:

formatting original scalable encoded media data into a format including a first portion corresponding at least to non-media type specific scalability attributes of the original encoded media data wherein at least some non-media type specific scalability attributes have a universal meaning across a plurality of media types and said first portion corresponding to data structure information of a second portion and the second portion corresponding to the original scalable encoded media data arranged in a non-media type specific indexable data structure having at least one dimension wherein said encoded media data is arranged in format generic to all types of media;

providing information corresponding to receiving attributes of a media destination of at least one type of scalable encoded media;

generically transcoding the formatted media data prior to delivery to the media destination and without knowledge of the content of the original media data to generate a scaled version of the formatted media data adapted to the receiving attributes of the media destination, based on matching the scalability attributes and the receiving attributes, wherein the matching includes determining whether a scalability attribute identified in the first portion of the formatted media data matches a received attribute of the receiving attributes of the media destination;

if the scalability attribute matches the received attribute, comparing a limit for the received attribute to a value for the scalability attribute; and the transcoding includes scaling the scalability attribute if the value is outside the limit.

2. An system of delivery of encoded scalable media data comprising:

media source for providing scalable encoded media data in a format including a first portion corresponding at least to non-media type specific scalability attributes of the original encoded media data wherein at least some non-media type specific scalability attributes have a universal meaning across a plurality of media types and said first portion corresponding to data structure information of a second portion and the second portion corresponding to the original scalable encoded media data arranged in a non-media type specific indexable data structure having at least one dimension wherein said encoded media data is arranged in a format generic to all types of media;

media destination for providing information corresponding to receiving attributes of the media destination of at least one type of scalable encoded media; and transcoder for generically transcoding the formatted original scalable encoded media data prior to delivery to the media destination and without knowledge of the content of the original media data generically based on matching the scalability attributes and the receiving attributes to generate a scaled version of the formatted original scalable encoded media data, wherein the matching includes determining whether a scalability attribute identified in the first portion of the formatted media data matches a received attribute of the receiving attributes of the media destination; if the scalability attribute matches the received attribute, comparing a limit for the received attribute to a value for the scalability attribute; and the transcoder scales the scalability attribute if the value is outside the limit.

3. A method of transcoding comprising:

receiving formatted scalable media bit-stream including a first portion corresponding at least to non-media type specific scalability attributes of the original encoded media data wherein at least some non-media type specific scalability attributes have a universal meaning across a plurality of media types and data structure information of a second portion and the second portion corresponding to the original scalable encoded media data arranged in a non-media type specific indexable data structure having at least one dimension wherein said encoded media data is arranged in a format generic to all types of media;

receiving information corresponding to receiving attributes of a media destination of at least one type of scalable encoded media;

comparing the scalability attributes and the receiving information; and performing one of truncation, dropping, and rearranging of the bit-stream subset dependent on the comparison and without knowledge of the content of the original media data to generate a scaled version of the formatted original scalable encoded media data adapted to the media destination and using the data structure information;

wherein the comparing includes determining whether a scalability attribute identified in the first portion of the formatted media data matches a received attribute of the receiving attributes of the media destination; and if the scalability attribute matches the received attribute, comparing a limit for the received attribute to a value for the scalability attribute; and the performing one of truncation, dropping, and rearranging includes performing one of truncation, dropping, and rearranging if the value is outside the limit.

4. The method as described in claim 1 wherein the non-media type specific attributes includes at least one of size of bitstream, display resolution, signal-to-noise ratio, and processing power.

5. The method as described in claim 1 further comprising associating each attribute with an n-byte code.

6. The method as described in claim 5 further comprising reserving codes for attributes having universal meaning across all media types.

7. The method as described in claim 5 further comprising reserving codes for future attribute types.

8. The method as described in claim 1 wherein the data structure is arranged so as to have a plurality of tiers wherein each tier corresponds to a different type of scalability where each tier is indexable by a table of contents.

9. The method as described in claim 8 wherein said plurality of tiers are arranged in a cube including a plurality of bitstream sub-sets arranged wherein each dimension of the cube corresponds to one of the plurality of scalability type tiers.

10. The method of claim 1 wherein said receiving attributes are standardized so as to enable unambiguous comparison with the scalability attributes.

11. The method of claim 9 further comprising transcoding by truncating bit-stream sub-sets, repacking the bit-stream, and updating the table of contents.

12. The system as described in claim 2 wherein the non-media type specific attributes includes at least one of size of bitstream, display resolution, signal-to-noise ratio, and processing power.

13. The system as described in claim 2 wherein the data structure is arranged in a cube including a plurality of bitstream sub-sets wherein each dimension of the cube corresponds to one of a plurality of tiers corresponding to scalibility where each tier is indexable by a table of contents.

14. The system of claim 2 wherein said receiving attributes are standardized so as to enable unambiguous comparison with the scalability attributes.

15. The system of claim 13 further comprising transcoding by truncating bit-stream sub-sets, repacking the bit-stream, and updating the table of contents.

16. The method as described in claim 3 further comprising standardizing receiving attributes so as to enable unambiguous comparison with the scalability attributes, wherein scalability attributes includes at least one of size of bitstream, display resolution, signal-to-noise ratio, and processing power.

* * * * *